(12) United States Patent
Mathieu

(10) Patent No.: US 7,708,223 B2
(45) Date of Patent: May 4, 2010

(54) METHOD AND DEVICE FOR ENHANCING THE BRAKING EFFICIENCY OF AN AIRCRAFT DURING THE GROUND RUN THEREOF

(75) Inventor: Gerard Mathieu, Pibrac (FR)

(73) Assignee: Airbus France, Toulouse (FR)

( * ) Notice: Subject to any disclaimer, the term of this patent is extended or adjusted under 35 U.S.C. 154(b) by 403 days.

(21) Appl. No.: 11/718,490

(22) PCT Filed: Oct. 18, 2005

(86) PCT No.: PCT/FR2005/002574

§ 371 (c)(1),
(2), (4) Date: May 2, 2007

(87) PCT Pub. No.: WO2006/048519

PCT Pub. Date: May 11, 2006

(65) Prior Publication Data

US 2009/0065636 A1    Mar. 12, 2009

(30) Foreign Application Priority Data

Nov. 2, 2004    (FR) .................................. 04 11634

(51) Int. Cl.
*B64C 25/42* (2006.01)

(52) U.S. Cl. ............................................. 244/50; 701/3

(58) Field of Classification Search ................... 244/50, 244/51, 111, 113, 183; 188/71.5, 71.6; 303/126; 701/16, 3
See application file for complete search history.

(56) References Cited

U.S. PATENT DOCUMENTS

| 4,580,744 A | * | 4/1986 | Guichard ..................... 244/111 |
| 4,646,242 A | | 2/1987 | Valaas et al. |
| 5,167,385 A | * | 12/1992 | Hafner ....................... 244/76 R |

FOREIGN PATENT DOCUMENTS

| EP | 0809165 | 11/1997 |
| EP | 0936114 | 8/1999 |
| GB | 754405 | 8/1956 |

OTHER PUBLICATIONS

International Search Report dated Jan. 5, 2006 with English translation.

* cited by examiner

*Primary Examiner*—Timothy D Collins
*Assistant Examiner*—Michael Kreiner
(74) *Attorney, Agent, or Firm*—Dickinson Wright PLLC

(57) ABSTRACT

According to the invention, the elevators (8) and/or the adjustable horizontal stabilizer (6) are operated in such a way that a negative lift (DP2) is generated and a nose-up moment (CDP) is thus created to counter the nose-down moment (CB) resulting from braking. The value of the negative lift (DP2) matches the vertical force exerted by the ground on the front landing gear (12), which force is subject to a reference value (Fav3).

7 Claims, 4 Drawing Sheets

METHOD AND DEVICE FOR ENHANCING THE BRAKING EFFICIENCY OF AN AIRCRAFT DURING THE GROUND RUN THEREOF

The present invention relates to a method and a device for enhancing the braking efficiency of an aircraft taxiing on the ground.

It is known that current airplanes, in particular civil transport airplanes, have an elongated fuselage supported, on the ground, by a main landing gear, disposed in an intermediate position of said fuselage, and by a steerable front landing gear, normally called nose gear. Furthermore, the wheels of the main landing gear are provided with brakes, whereas said front landing gear, which is used for laterally guiding the airplane on the ground, has wheels without brakes.

The consequence of these arrangements is that, when such an airplane taxiing on the ground has the brakes applied, the braking force exerted by the wheels of the main landing gear generates a nose-down moment tending to lessen the load on said main landing gear and increase the load on said front landing gear. Consequently, the main landing gear is not applied to the ground with sufficient pressure to afford the airplane optimal braking efficiency.

The object of the present invention is to remedy this drawback and to confer on such an airplane taxiing on the ground a braking efficiency that is always optimal.

To this end, according to the invention, the method for enhancing the braking efficiency of an aircraft taxiing on the ground, said aircraft comprising an elongated fuselage and being provided:

with a main landing gear, disposed in an intermediate position of said fuselage and comprising wheels provided with brakes;

with a steerable front landing gear, disposed at the front of said fuselage and being used to laterally guide said aircraft on the ground, said front landing gear comprising wheels without brakes; and with controllable aerodynamic surfaces disposed at the rear of the fuselage and capable of generating a variable negative lift force, is noteworthy in that:

in a preliminary phase, a reference value is determined for the vertical force exerted by the ground on said front landing gear, said reference value being capable of ensuring a satisfactory efficiency of said front landing gear for the lateral guiding of said aircraft when the latter is taxiing on the ground; then while said aircraft taxiing on the ground is braking:
the instantaneous vertical force actually exerted by the ground on said front landing gear is measured; and
said rear aerodynamic surfaces are controlled so that they generate a negative lift value capable of maintaining said instantaneous vertical force at a value at least approximately equal to said reference value.

Thus, with the present invention, a nose-up moment is created opposing said braking nose-down moment, and the braking efficiency of the aircraft is increased—and therefore the length of runway needed for the latter to stop is reduced—by controlling the vertical force on the front landing gear—while retaining sufficient capability for the front landing gear to laterally guide the aircraft. It will also be noted that, by deflecting said rear aerodynamic surfaces, the drag of the aircraft is increased, which favors the braking.

Said reference value for the vertical force exerted by the ground on said front landing gear can be determined by calculation or indeed by direct experimental measurement on said front landing gear. It is chosen to allow for sufficient lateral control of the aircraft and to retain a margin of power on the control column.

When said aircraft comprises, for controllable rear aerodynamic surfaces, both an adjustable horizontal stabilizer and elevators hinged on said stabilizer, the generation of said negative lift value can be obtained by action on said adjustable horizontal stabilizer, or by action on said elevators, or even by simultaneous actions on said adjustable horizontal stabilizer and on said elevators.

However, implementing the method according to the present invention is particularly easy when the elevators alone are used. In practice, all that is then needed is to modify, while the aircraft is taxiing with the brakes applied, the characteristic of the aircraft giving the deflection of the elevators according to the deflection command controlled so that, when the latter is zero, the deflection angle of said elevators assumes a nose-up value.

The present invention also relates to a device for implementing the method described above. In addition to the means generating a characteristic giving the deflection angle of the elevators according to a deflection command, said characteristic having a neutral point, the device according to the invention can comprise:

means for continuously measuring the vertical force exerted on said steerable front landing gear, when said aircraft is taxiing on the ground with the brakes being applied;

memory means, in which is stored said reference value;

comparison means receiving said continuous measurement of said vertical force and said reference value and calculating the difference;

computation means receiving said difference and a measurement of the taxiing speed of said aircraft and delivering, for the deflection angle of said elevators, a nose-up value that is non-zero when the deflection command is zero, said non-zero nose-up value decreasing with the speed of the aircraft;

computation means which, from said non-zero nose-up value, determine a modified characteristic giving the deflection angle of the elevators according to the deflection command; and switching means for applying to said elevators either said usual characteristic, or said modified characteristic, depending on whether the wheels of the main landing gear have the brakes applied or not.

The figures of the appended drawing will give a good understanding of how the invention can be applied. In these figures, identical references denote similar elements.

Figure 1:
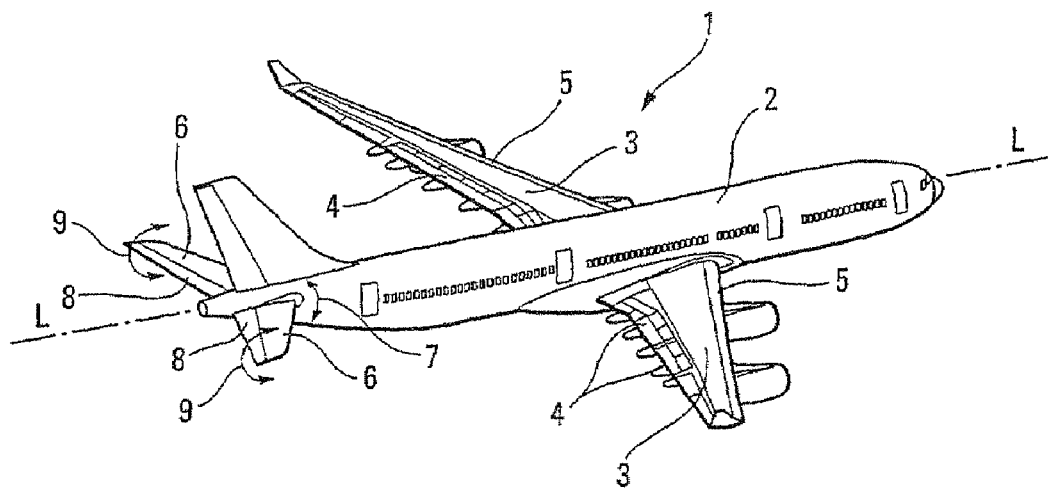
FIG. 1 shows, in diagrammatic perspective from above, a wide-bodied civil aircraft.

The wide-bodied airplane 1, shown diagrammatically in flight in FIG. 1, comprises a fuselage 2, elongated along a longitudinal axis L-L, and wings 3, provided with trailing edge flaps 4 and leading edge slats 5. It also comprises a horizontal stabilizer 6 with tilt adjustment, as illustrated by the double arrow 7. On the rear edge of said adjustable horizontal stabilizer 6, are hinged elevators 8 that can turn relative to said horizontal stabilizer 6, as is illustrated by the double arrows 9.

Figure 2A:
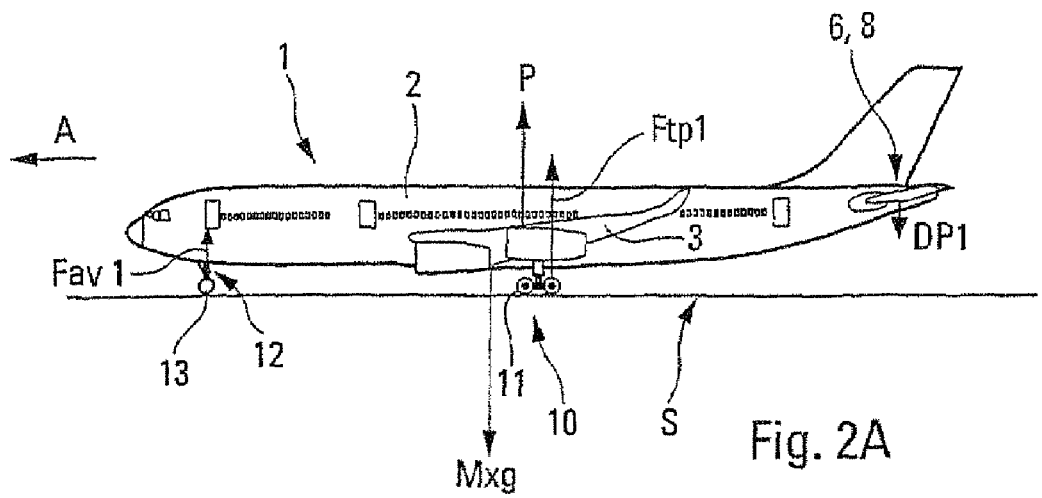
FIGS. 2A, 2B and 2C illustrate the method of the present invention.
Figure 2B:
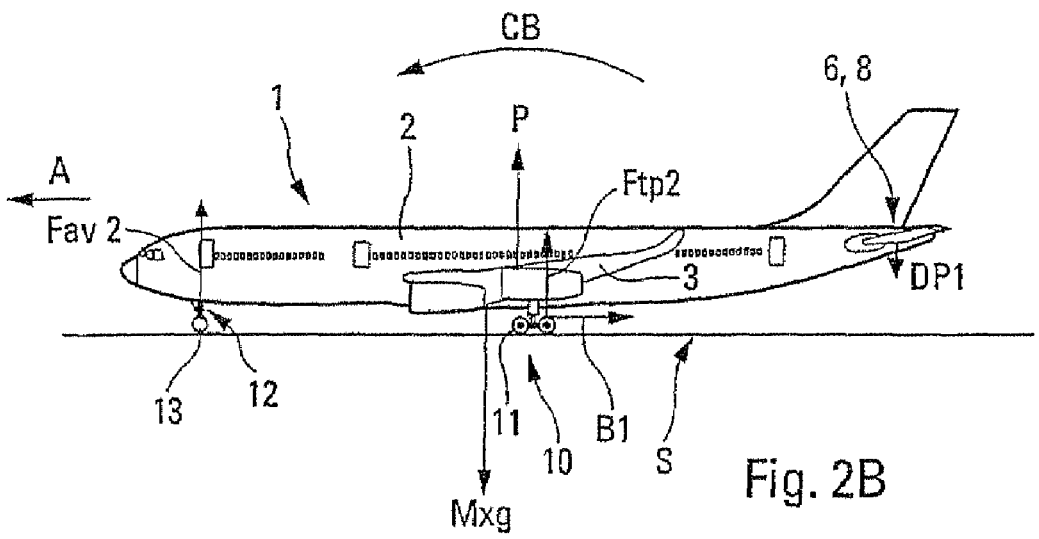
Figure 2C:
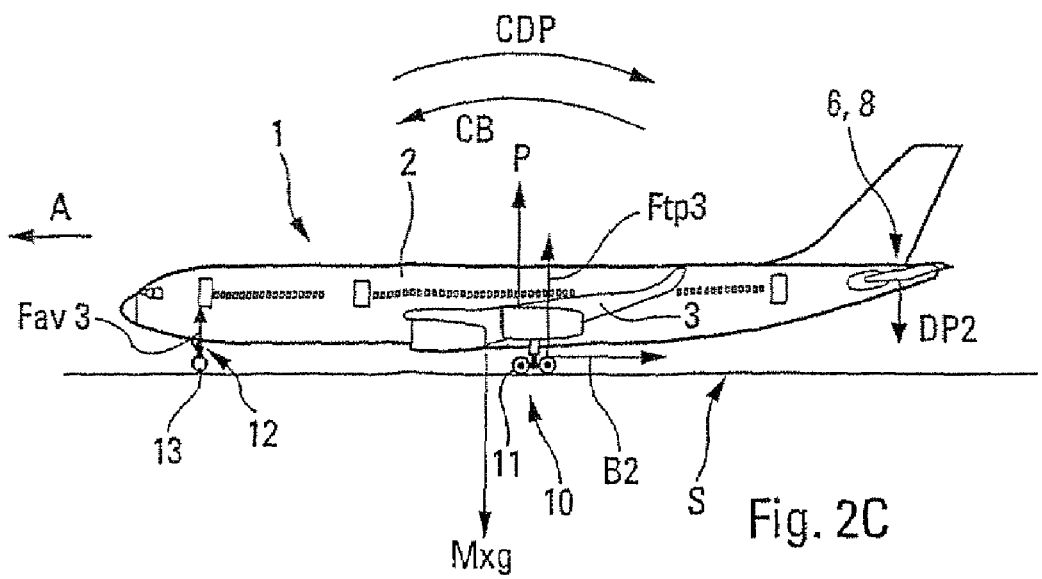

Moreover, as is illustrated in FIGS. 2A, 2B and 2C, the airplane 1 comprises a main landing gear 10, disposed in an intermediate position relative to the fuselage 2 and provided with wheels 11 equipped—in a manner that is known and not represented—with brakes, and a steerable front landing gear 12 (normally called nose gear), disposed at the front of the fuselage 2 and used to guide said airplane 1, when the latter is taxiing on the ground. Said front landing gear 12 comprises wheels 13 without brakes.

In FIGS. 2A, 2B and 2C, the airplane 1 is represented in three different situations, while it is moving on the ground S in the direction A with a speed V, bearing on its landing gears 10 and 12, the wheels 11 and 13 of which are rolling on said ground S. In each of these situations, the wings 3 and the associated flaps and slats 4, 5 generate an equal lift P, whereas the horizontal stabilizer 6 and/or the elevators 8 generate a negative lift DP of value DP1 or DP2. In the three situations, the airplane 1 is subject to the action of its weight M×g, an expression in which M represents the mass of said airplane and g the gravity acceleration.

In the situation represented in FIG. 2A, it is assumed that the airplane 1, subject to the action of the lift P, of the weight M×g and of a weak negative lift DP1 (due to a normal setting of the horizontal stabilizer 6 with the elevators 8 in aerodynamic extension with said stabilizer), is taxiing freely on the ground S, the wheels 11 not having the brakes applied. The result is then that the gears 10 and 12 are respectively subject to vertical forces Ftp and Fav of respective values Ftp1 and Fav1, the force Fav1 exerted on the front landing gear 12 being appropriate to the ground guidance function of the airplane 1 having to be exerted by said front landing gear 12. Of course, the values of Fav1 and Ftp1 depend on the negative lift DP1, on the weight M×g, on the longitudinal position of the center of gravity of the airplane 1, on the lift P (that is, the speed V and the configuration of the flaps 4 and slats 5) and on the longitudinal aerodynamic moment.

In FIG. 2B, it is assumed that, based on the situation of FIG. 2A, the brakes of the wheels 11 of the main landing gear 10 are actuated to produce a braking force B in order to enable said airplane to be stopped, either on landing, or on interrupting a take-off. This braking force generates a nose-down moment C3, increasing the load on the front landing gear 12 and reducing the load on the main landing gear 10, such that the vertical force Ftp assumes a value Ftp2 less than Ftp1, whereas the vertical force Fav assumes a value Fav2 greater than Fav1. Since the load on the main landing gear 10 is reduced, its wheels 11 are not applied optimally on the ground S and the braking force B is limited exceptionally to a value B1 which is not optimal.

To make it possible to increase the braking force beyond the value B1, the method according to the present invention (see FIG. 2C) involves the adjustable horizontal stabilizer 6 and/or the elevators 8 to increase, at least while the wheels 11 have the brakes applied, the negative lift DP to a value DP2, greater than DP1. The result is that this increase in negative lift creates a nose-up moment CDP which opposes the action of the braking moment CB and which, when the wheels 11 of the main landing gear 10 have the brakes applied, reduces the load on the front landing gear 12 and loads the main landing gear 10. The vertical force Fav on the front landing gear 12 can then assume a value Fav3 less than Fav2, whereas the vertical force Ftp on the main landing gear 10 can assume a value Ftp3 greater than Ftp2.

Thus, by giving the negative lift DP a value DP2 greater than the usual value DP1 used in the situations of FIGS. 2A and 2B, the force Ftp is increased beyond the value Ftp2, such that the wheels 11 are correctly applied to the ground S and that the braking force can assume a value B2, greater than B1, which makes the braking more efficient. Furthermore, the value DP2 is chosen such that the value Fav3 assumed by the vertical force Fav on the front landing gear 12 allows said front landing gear 12, just like Fav1, to be used to guide the airplane 1 on the ground.

The method according to the present invention therefore consists in controlling, to the value Fav3 used as a reference, the vertical force Fav exerted by the ground on the front landing gear 12, by controlling the negative lift DP.

As mentioned above, the increase in the negative lift DP from the value DP1 to the value DP2 can be obtained by action of the adjustable horizontal stabilizer 6, or by action of the elevators 8 or even by combined action of the adjustable horizontal stabilizer 6 and of the elevators 8. However, in an embodiment that is particularly easy to implement, it is advantageous to involve only the elevators 8.

Figure 3:
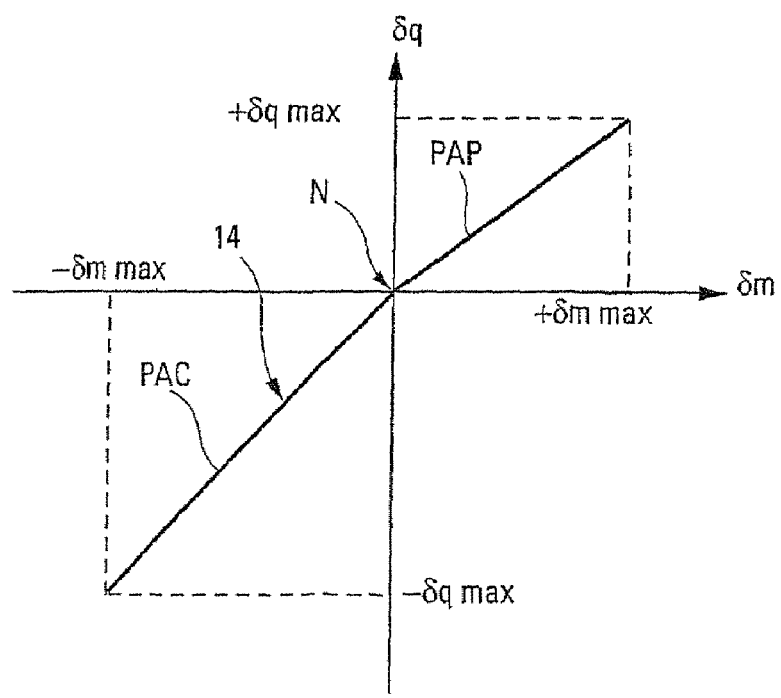
FIG. 3 shows a usual airplane characteristic indicating the value of the deflection angle δq of the elevators of said airplane according to the deflection command δm.

It is known in fact, in a known manner, as is illustrated by the curve 14 of FIG. 3, that the characteristic of the airplane 1 giving, in a system of rectangular axes, the deflection angle δq of the elevators 8 according to the deflection command δm on the control column comprises a nose-down portion PAP, normally linear, and a nose-up portion PAC, also normally linear, said nose-down and nose-up portions being joined to each other at a neutral point N. Thus, for a variation of the nose-down deflection command δm between 0 and a maximum value +δmmax (and conversely between +δmmax and 0), the nose-down deflection of the elevators 8 varies between 0 and a maximum value +δqmax (and conversely between +δqmax and 0). Similarly, for a variation of the nose-up deflection command δm between 0 and a maximum value −δmmax (and conversely between −δmmax and 0), the nose-up deflection of the elevators 8 varies between 0 and a maximum value −δqmax (and conversely between −δqmax and 0). It is also known that, when the airplane 1 is taxiing on the ground S in the usual known situations represented in FIGS. 2A and 2B, the deflection command δm is zero (the elevators 8 are in aerodynamic extension of the horizontal stabilizer 6) such that the deflection angle δq is also zero: we are then therefore at the neutral point N of the characteristic 14, with a possible weak negative lift of value DP1 due to the usual setting of the adjustable horizontal stabilizer 6.

Figure 4:
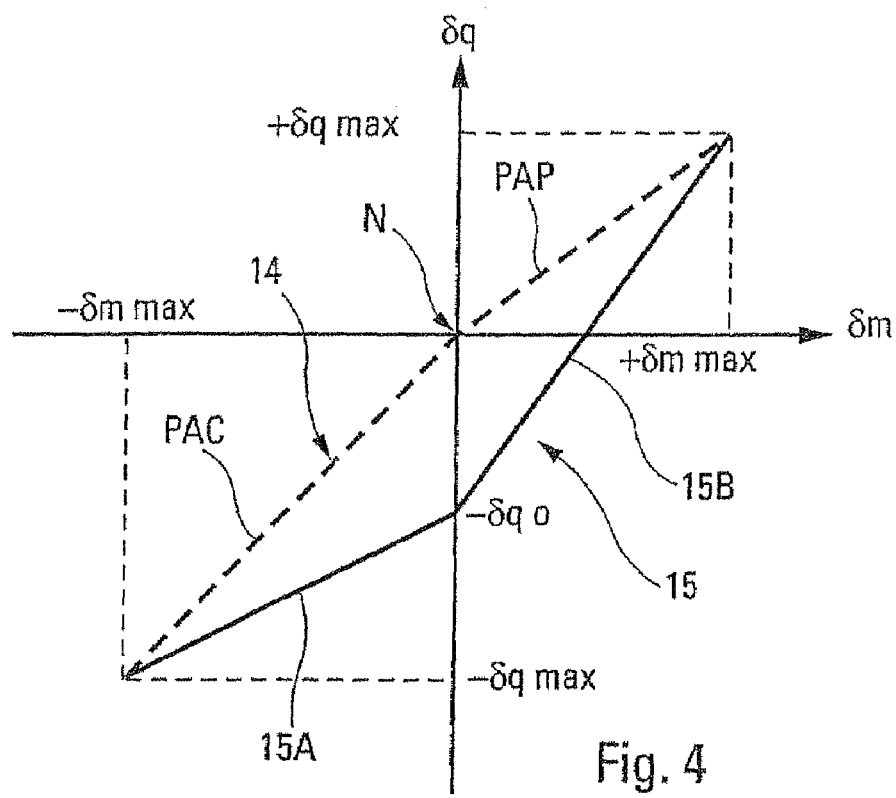
FIGS. 4 and 5 show two examples of characteristic δq, δm modified in accordance with the present invention.
Figure 5:
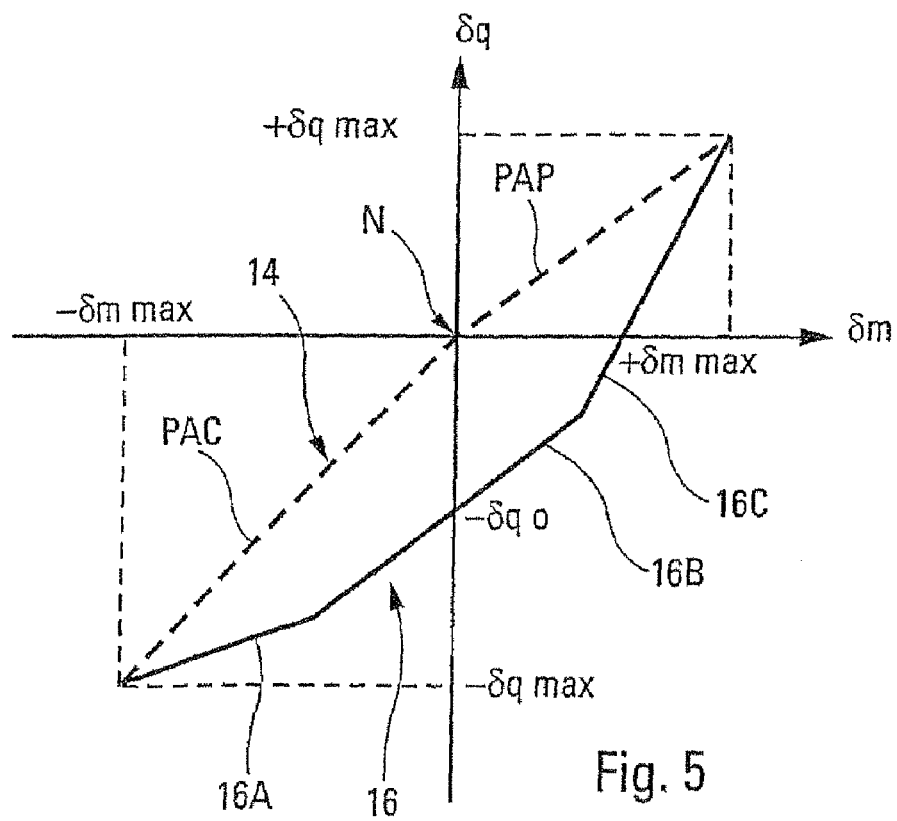

According to a significant feature of the present invention, to obtain a negative lift value DP2 greater than the value DP1, when the control column is in the neutral position, the characteristic 14 of FIG. 3 is modified for the deflection angle δq to assume a nose-up value −δqo (able to generate the negative lift value DP2) when the deflection command δm is zero (see FIGS. 4 and 5).

In the exemplary embodiment illustrated by FIG. 4, the characteristic 14 is modified to a characteristic 15 comprising a part 15A, for example straight, joining the point δm=0, δq=−δqo to the point δm=−δm max, δq=−δq max, and a part 15B, for example straight, joining the point δm=0, δq=−δqo to the point δm=+δm max, δq=+δq max.

As a variant, in the exemplary characteristic modification shown by FIG. 5, the characteristic 14 is modified to a characteristic 16 comprising an intermediate part 16B, for example straight, which passes through the point m=0, δq=−δqo and the ends of which are linked to the points δm=−δm max, δq=−δq max and δm=+δm max, δq=+δq max, respectively by end parts 16A and 16C, for example straight.

It will easily be understood that the characteristics 15 and 16 of FIGS. 4 and 5 are only examples with numerous other possibilities.

Moreover, since, while the braking action B is being applied, the forward speed V of the airplane 1 on the ground S decreases, it follows that the lift value P decreases, so increasing the value of the forces Ftp and Fav and that, to obtain the same value Fav3 of the vertical force Fav on the front landing gear 12, the value DP2 of the negative lift DP must also decrease accordingly. The value DP2 must therefore decrease with the forward speed V of the airplane 1, such that the same applies for the absolute value |δqo| of the deflection angle −δqo generating the negative lift value DP2 when the deflection command δm is zero.

Figure 6:
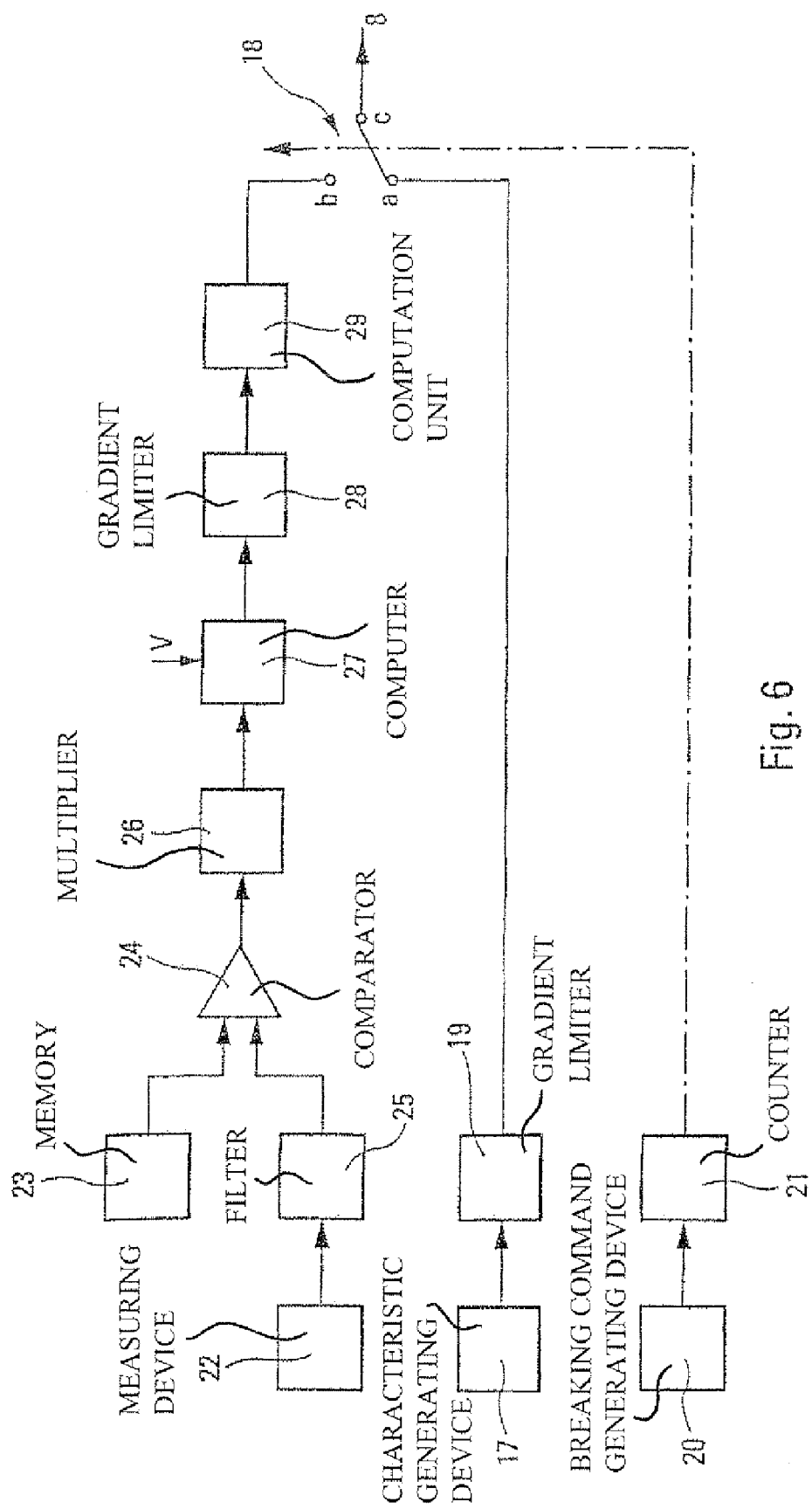
FIG. 6 is the block diagram of an exemplary embodiment of a system implementing the method according to the present invention.

FIG. 6 represents the block diagram of a system for implementing the method according to the present invention. This system comprises:
- a known device 17, generating the usual characteristic 14 (or any other similar characteristic) having a neutral point N, for which δm=0 and δq=0;
- a switching device 18 comprising a normally closed contact a to which said device 17 is linked via a gradient limiter (for example 20°/s), said switching device 18 comprising another normally open contact b and a common contact c linked to the control system of the elevators 8;
- a device 20 for generating a braking command for the wheels 11 of the main landing gear 10, said device 20 controlling the switchover of the switching device 18 from its unoperated position to its operated position, via a counter 21;
- means 22 for measuring the actual vertical force Fav exerted on the steerable front landing gear 12 while the airplane 1 is taxiing on the ground S, said means being, for example, of force sensor or pressure sensor type;
- memory means 23, in which is stored the reference value Fav3 for said vertical force Fav;
- comparison means 24 receiving at their inputs, respectively the reference value Fav3 coming from the memory means 23 and the measurement of the vertical force Fav coming from the measurement means 22 via a filter 25;
- a multiplier 26, for multiplying the difference signal, derived from the comparison means 24, by a coefficient K, constant or dependent on the speed V, representative of the effectiveness of the elevators 8 on the vertical force Fav exerted on the front landing gear 12;
- a computer 27, receiving the signal derived from the multiplier 26 and a signal representative of the instantaneous speed of the airplane 1 and generating the absolute value |δqo|, decreasing with the speed V, capable of providing at each instant the negative lift DP2 required to obtain the desired force value on the front landing gear 12;
- a gradient limiter 28 (for example 5°/s) receiving said absolute value |δqo|; and
- computation means 29 which, based on said absolute value |δqo| received from the gradient limiter 28, determine the characteristic 15 or 16 (or any other similar characteristic) and transmit it to the normally open contact b of the switching device 18.

Thus, when the airplane 1 is taxiing on the ground S without the brakes being applied, it is the characteristic 14 (or any similar characteristic with neutral point N) that is available to control the elevators 8, via the subsystem 17, 19, a and c.

Conversely, when a braking command generated by the device 20 is applied to the wheels 11 of the main landing gear 10 for a time predetermined by the counter 21, the latter switches over the switching device 18, so that the common contact c is then linked to the contact b. In this case, it is the characteristic 15 (or the characteristic 16 or any other characteristic with a point δm=0, δq=−δqo) that appears on the common contact c to control the elevators 8.

When the braking command ceases, the switching device 18 switches back so as to once again link the contacts a and c and the characteristic 14 is again available on the common contact c. The gradient limiter 19 is used to eliminate the additional nose-up moment when the braking moment CB disappears.

The system for improving the braking efficiency of an aircraft according to the present invention is not limited to the embodiment shown diagrammatically in FIG. 6 and given by way of example in order to clearly understand the invention. For example, the system of FIG. 6 could be modified for the device 17, generating the characteristic 14, and the computer 27, generating the characteristics 15 or 16, to have common parts.

The invention claimed is:

1. A method for enhancing the braking efficiency of an aircraft (1) taxiing on the ground (S), said aircraft (1) comprising an elongated fuselage (2) and being provided:
   - with a main landing gear (10), disposed in an intermediate position of said fuselage (2) and comprising wheels (11) provided with brakes;
   - with a steerable front landing gear (12), disposed at the front of said fuselage (2) and being used to laterally guide said aircraft (1) on the ground, said front landing gear (12) comprising wheels (13) without brakes; and
   - with controllable aerodynamic surfaces (6, 8) disposed at the rear of the fuselage (2) and capable of generating a variable negative lift force (DP), wherein:
   - in a preliminary phase, a reference value (Fav3) is determined for the vertical force (Fav) exerted by the ground (S) on said front landing gear (12), said reference value being capable of ensuring a satisfactory efficiency of said front landing gear (12) for the lateral guiding of said aircraft (1) when the latter is taxiing on the ground (S); then
   - while said aircraft (1) taxiing on the ground (S) is braking:
   - the instantaneous vertical force (Fav) actually exerted by the ground (S) on said front landing gear (12) is measured; and
   - said rear aerodynamic surfaces (6, 8) are controlled so that they generate a negative lift value (DP2) capable of maintaining said instantaneous vertical force (Fav) at a value at least approximately equal to said reference value (Fav3).

2. The method as claimed in claim 1, wherein said negative lift value (DP2) decreases with the speed of said aircraft (1).

3. The method as claimed in claim 1, applied to an aircraft (1) comprising an adjustable horizontal stabilizer (6) and elevators (8) hinged on said adjustable horizontal stabilizer (6), wherein said negative lift value (DP2) is obtained at least partly by controlling said adjustable horizontal stabilizer (6).

4. The method as claimed in claim 1, applied to an aircraft (1) with rear aerodynamic surfaces that include elevators (8), wherein said negative lift value (DP2) is obtained at least partly by controlling said elevators (8).

5. The method as claimed in claim 4, wherein said negative lift value (DP2) is obtained by controlling the elevators (8) alone and in that the characteristic giving the deflection angle (δq) of said elevators (8) is modified according to the deflection command (δm), such that, when said deflection command (δm) is zero, the deflection angle (δq) assumes a nose-up value (−δqo).

6. The method as claimed in claim 5,
wherein the absolute value |δqo| of said nose-up value (−δqo) decreases with the speed of said aircraft (1).

7. A device for implementing the method as claimed in claim 6, provided with means (17, 19) generating a characteristic (14) giving the deflection angle (δq) of the elevators (8) according to a deflection command (δm), said characteristic (14) having a neutral point (N) (for which δq=0 and δm=0),
wherein it comprises:
means (22) for continuously measuring the vertical force (Fav) exerted on said steerable front landing gear (12), when said aircraft (1) is taxiing on the ground with the brakes being applied;
memory means (23), in which is stored said reference value (Fav3);
comparison means (24) receiving said continuous measurement of said vertical force (Fav) and said reference value (Fav3) and calculating the difference;
computation means (27) receiving said difference and a measurement of the taxiing speed (V) of said aircraft and delivering, for the deflection angle (δq) of said elevators (8), a nose-up value (−δqo) that is nonzero when the deflection command (δm) is zero, said nonzero nose-up value decreasing with the speed (V) of the aircraft;
computation means (29) which, from said nonzero nose-up value, determine a modified characteristic (15, 16) giving the deflection angle (δq) of the elevators (8) according to the deflection command (δm); and
switching means (18) for applying to said elevators (8) either said usual characteristic (14), or said modified characteristic (15, 16), depending on whether the wheels (11) of the main landing gear (10) have the brakes applied or not.

* * * * *